United States Patent [19]
Pearson, Jr. et al.

[11] Patent Number: 5,634,577
[45] Date of Patent: Jun. 3, 1997

[54] OPEN BOTTOM CROSSOVER TOOL BOX INSERT

[76] Inventors: James C. Pearson, Jr.; Callie N. Pearson, both of P.O. Box 241, Muleshoe, Tex. 79347

[21] Appl. No.: 579,384

[22] Filed: Dec. 27, 1995

Related U.S. Application Data

[63] Continuation-in-part of Ser. No. 192,109, Feb. 4, 1994, abandoned.

[51] Int. Cl.⁶ .................................................. B65D 43/16
[52] U.S. Cl. ........................ 224/242; 224/403; 224/404
[58] Field of Search .................................. 224/242, 402, 224/403, 404, 279, 281, 495, 510, 539, 319, 325, 328; 312/293.2, 304, 308, 321, 350, 351; 220/528; 206/587

[56] References Cited

U.S. PATENT DOCUMENTS

| | | | |
|---|---|---|---|
| 3,339,994 | 9/1967 | Reddig et al. | 312/351 |
| 3,550,978 | 12/1970 | Magee | 312/350 |
| 3,640,423 | 2/1972 | Parker . | |
| 4,469,364 | 9/1984 | Rafi-Zadeh . | |
| 4,789,195 | 12/1988 | Fletcher . | |
| 4,830,242 | 5/1989 | Painter . | |
| 4,844,305 | 7/1989 | McKneely . | |
| 4,850,519 | 7/1989 | Farmer, Jr. et al. | 224/328 |
| 4,917,430 | 4/1990 | Lawrence . | |
| 4,967,944 | 11/1990 | Waters . | |
| 4,969,678 | 11/1990 | Loisel . | |
| 5,088,636 | 2/1992 | Barajas . | |
| 5,297,707 | 3/1994 | Weber | 224/404 |

*Primary Examiner*—David J. Walczak
*Assistant Examiner*—Charles R. Eloshway
*Attorney, Agent, or Firm*—Novak Druce Reynolds Burt

[57] ABSTRACT

A truck storage box device for use in the bed of a pick-up truck, having a bottom, and a plurality of interconnected sides extending upward from the periphery of the bottom which intersect to provide an open top for access to the interior formed between the bottom and the sides. The bottom and sides form an open container in which a plurality of spaced pairs of opposed, elongated rails extend horizontally along opposite interior wall portions thereof in a spaced relationship with the bottom. Each pair of opposed rails is arranged to slidably receive and support a number of elongated trays thereon. Each of the trays is arranged to extend between pairs of opposed rails. Collectively, the pairs of opposed rails form a vertical array in which a number of trays can be supported on each pair of opposed rails in a vertically stacked arrangement from which one or more intermediate trays may selectively be slid horizontally from within the stacked vertical arrangement for access to their particular contents. The box may be placed within a tool storage box, or a pair of spaced brackets may be provided which extend outwardly from the container for attaching the container to the bed of the pick-up truck, and hold the storage box in place in the bed of truck.

12 Claims, 3 Drawing Sheets

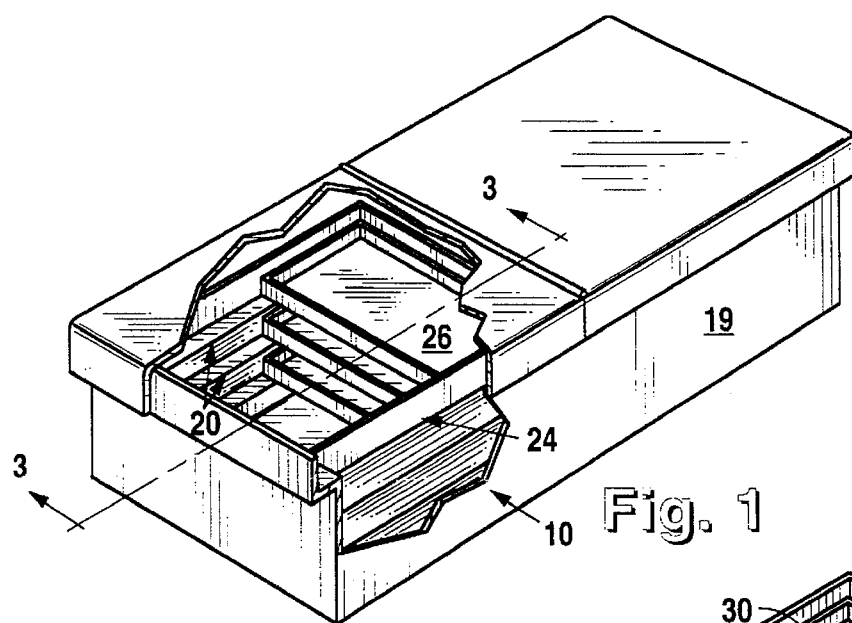
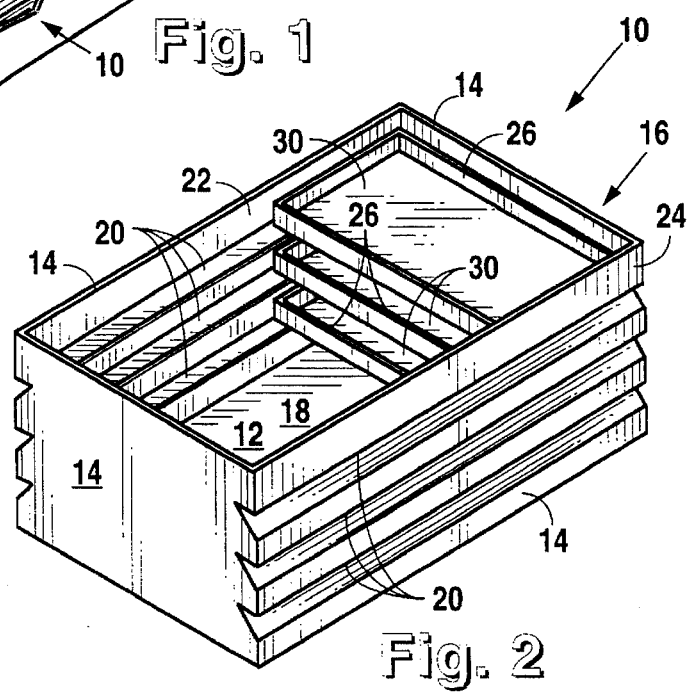
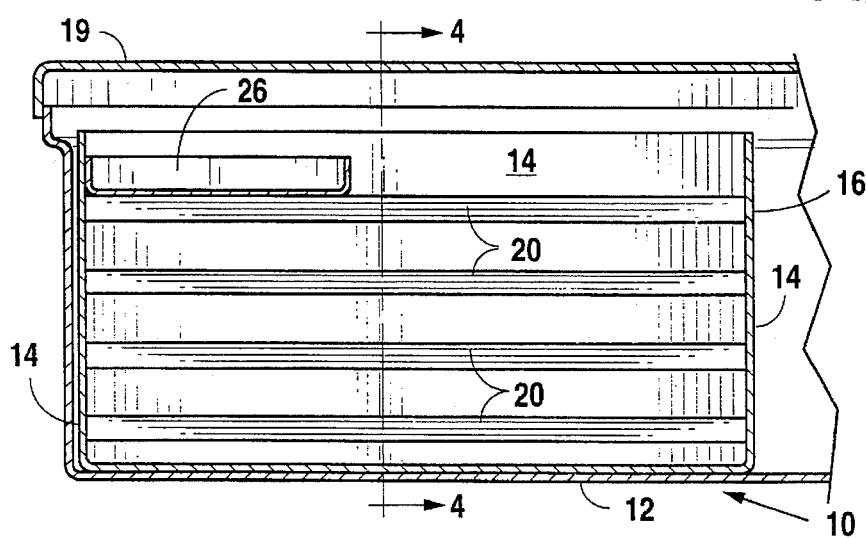

OPEN BOTTOM CROSSOVER TOOL BOX INSERT

This continuation-in-part claims priority to its parent application filed Feb. 4, 1994 as application Ser. No. 08/192,109 entitled CROSSOVER TOOL SAVER INSERT, now abandoned.

FIELD OF THE INVENTION

This invention relates to apparatus for organizing and compartmentalizing cargo components, and in particular this invention relates to inserts or liners for a tool storage box for use in pick-up truck beds.

BACKGROUND OF THE INVENTION

Pickup trucks often have tool boxes mounted in the truck bed for carrying a variety of different types of tools, equipment, and other loose items. Among other purposes, the tool boxes are intended to organize and restrain these items that would otherwise be loose in the truck's bed. In the event that the contained items are to be frequently used, their removal and return to the tool box must be convenient. This will often be the case when tools of the owner's trade are stored in the tool box.

One type of tool box that is normally located within the bed of a pickup truck is the crossover tool box. The crossover tool box is appropriately named because it is normally oriented across the bed of the pick-up truck; that is, the body of the tool box crosses over the bed from one side to the other. In most common embodiments of the crossover tool box it is intended that the box be positioned directly behind the rear window of the passenger cab. The crossover tool box normally has one or more lids hinged transversely to the longitudinal length of the box. In the instance of a single box lid, its length will extend across the truck bed and be hinged at one end adjacent to the side of the bed. In this configuration, the entire lid must be raised to access the interior of the box. If a pair of lids are employed, each is normally hinged in a back-to-back fashion, one to the other at the middle of the box. In this configuration, the lid has a length that is equal to one-half, or less of the width of the truck bed and permits the user to lift the lids independently from the sides of the truck.

One problem associated with truck tool boxes is gaining access to a specific item within the tool box without having to remove other various and sundry items that may be either on top of the desired item or obscuring it from view. One attempt at resolving this problem is the provision of sliding drawers that are used to compartmentalize the interior of the tool box; examples of such devices are described in U.S. Pat. Nos. 4,789,195, and 4,844,305. Many conventional truck tool boxes, however, are non-compartmentalized, and access to specific items contained therein may not easily be made without remove various and sundry other items in order to obtain access to the desired item.

SUMMARY OF THE INVENTION

It is a primary aim of the present invention to provide a novel truck storage box apparatus and method in which the desired contents thereof can be moved easily about within the truck storage box apparatus without having to remove other objects stored above or below the desired subject matter. In accordance with this aim, the truck storage box apparatus of the present invention provides a bottom, and a plurality of interconnected sides which extend upward from the periphery of the bottom and intersect to provide an open top for access to the interior formed between the bottom and the sides. The bottom and sides form an open container in which a plurality of spaced pairs of opposed, elongated rails extend horizontally along opposite interior wall portions thereof in a spaced relationship with the bottom. Each pair of opposed rails is arranged to slidably receive and support a number of elongated trays thereon, and each of the trays is arranged to extend between pairs of opposed rails. Collectively, the pairs of opposed rails form a vertical array in which a number of trays can be supported on each pair of opposed rails in a vertically stacked arrangement from which one or more intermediate trays may selectively be slid horizontally from within the stacked vertical arrangement for access to their particular contents.

It is further an aim of the present invention to provide a novel truck storage box apparatus and method which may be usable with non-compartmentalized truck tool boxes so that access to specific contents thereof can be easily obtained without having to remove various and sundry other items in order to obtain access to the desired item. In accordance with this aim, the present invention is arranged so that the novel truck storage box apparatus can be easily placed within the existing non-compartmentalized truck tool box, thus allowing access to specific items within the tool box without having to replace the existing conventional, non-compartmentalized truck tool box.

This invention includes features and/or components that have been invented and selected for their individual and combined benefits and superior performance as an insert for crossover tool boxes for pick-up trucks. The system includes several components that individually and singularly have new and novel features in and of themselves. Each of the individual components, however, work in association with, and are optimally mated to the others. Together, they yield an overall crossover tool box insert that has superior performance.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

BRIEF DESCRIPTION OF THE DRAWINGS

FIG. 1 is a perspective, partially cut-away view of a truck tool box, showing the truck storage box apparatus of the present invention placed in a conventional, non-compartmentalized truck tool box according to one embodiment;

FIG. 2 is a perspective view of the truck storage box apparatus of the present invention according to one embodiment;

FIG. 3 is a side, cut-away view of the conventional truck tool box and truck storage box apparatus of the present invention taken along cut-lines 3—3 of FIG. 1 according to one embodiment;

DETAILED DESCRIPTION OF THE INVENTION

Figure 4:
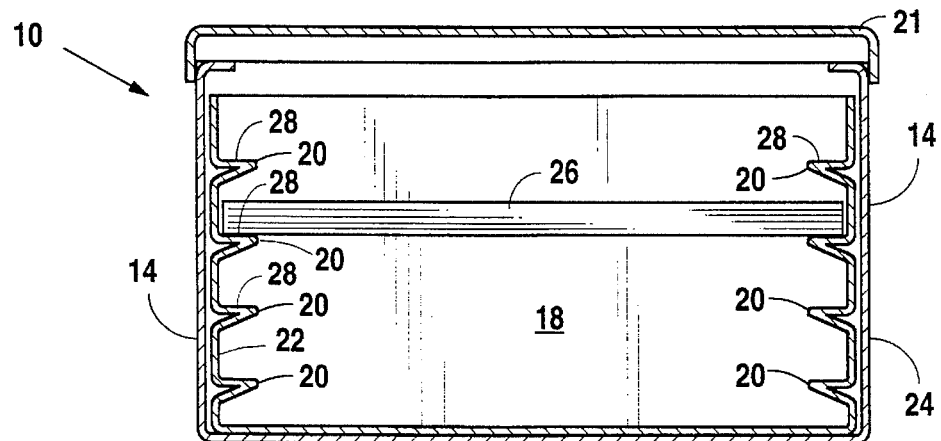
FIG. 4 is an end, cut-away side view of the truck storage box apparatus taken along cut lines 4—4 of FIG. 3 according to one embodiment.

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Certain terminology will be used in the following description for convenience and reference only and will not be limiting. For example, the words "rightwardly", "leftwardly", "upwardly" and "downwardly" will refer to directions in the drawings to which reference is made. The words "inwardly" and "outwardly" refer to directions toward and away from, respectively, the geometric center of the structure being referred to. This terminology includes these words, specifically mentioned derivatives thereof, and words of similar import.

Furthermore, elements may be recited as being "coupled"; this terminology's use anticipates elements being connected together in such a way that there may be other components interstitially located between the specified elements, and that the elements may be connected in fixed or movable relation one to the other. Certain components may be described as being adjacent to one another. In these instances, it is expected that such a relationship so described shall be interpretted to mean that the components are located proximate to one another, and normally with an absence of other components positioned therebetween. Still further, some structural relationships or orientations may be designated with the word "substantially". In those cases, it is meant that the relationship or orientation is as described, with allowances for variations that do not effect the cooperation of the so described component or components.

Two primary embodiments of the present invention are illustrated in the drawings and will be described herein. The first embodiment is described immediately hereinbelow and is shown in FIGS. 5–8. The second embodiment is shown in FIGS. 1–4 and is described thereafter.

As stated, the first embodiment is illustrated in FIGS. 5–8. Therein, a bed 230 of a pick-up truck 225 is shown from a perspective looking forward at a rear window 235 of a passenger cabin located forwardly of the bed 230. A crossover tool box 185 is shown oriented across the pick-up truck bed 230 so that a length 190 of the tool box is cross wise to a longitudinal dimension of the bed 230 which is aligned with a direction of forward travel of the truck 225. A width 195 of the tool box 185 is oriented perpendicularly to the length 190 and aligned with the direction of travel of the truck 225. The crossover tool box 185 includes four walls 200 that together with a tool box bottom 205 and tool box lid 215 establish an interior compartment 220 of the box 185. Each of the four walls 200 have interior surfaces as does the bottom 205 have a top surface 210. As may be appreciated from the illustration of FIG. 5, the crossover tool box 185 extends completely across the bed 230 of the truck 225.

Within the interior compartment 220 of the tool box 185 is an organizational insert 50. The insert 50 includes an insert body 65 having four walls within which an interior 55 of the insert is established and outside of which an exterior 60 of the insert 50 is established. The insert 50 has a length 70 and a width 75 which are perpendicularly oriented one to the other. When the insert 50 is installed within the crossover tool box 185, the widths and lengths of each unit are substantially parallel; that is, the length 70 of the insert 50 is substantially parallel to the length 190 of the tool box 185 and the width 75 of the insert 50 is substantially parallel to the and width 195 of the tool box 185.

Figure 5:
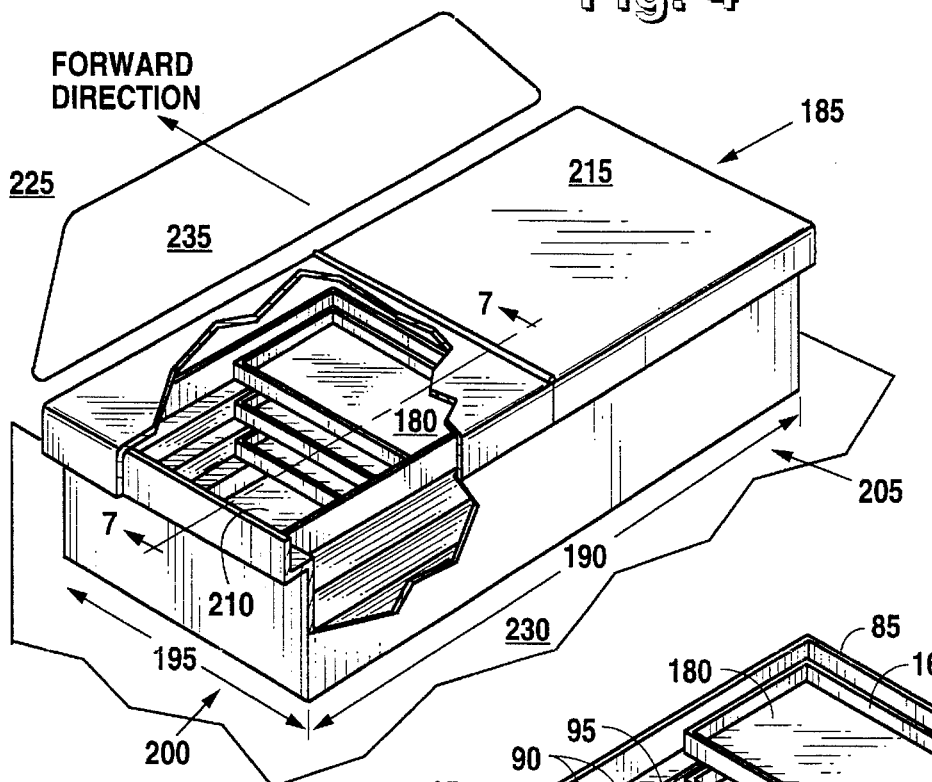
FIG. 5 is a perspective, partially cut-away view of a organizational insert and crossover tool box installed in the bed of a pick-up truck behind the rear window of the passenger cabin according to one embodiment of the present invention.
Figure 6:
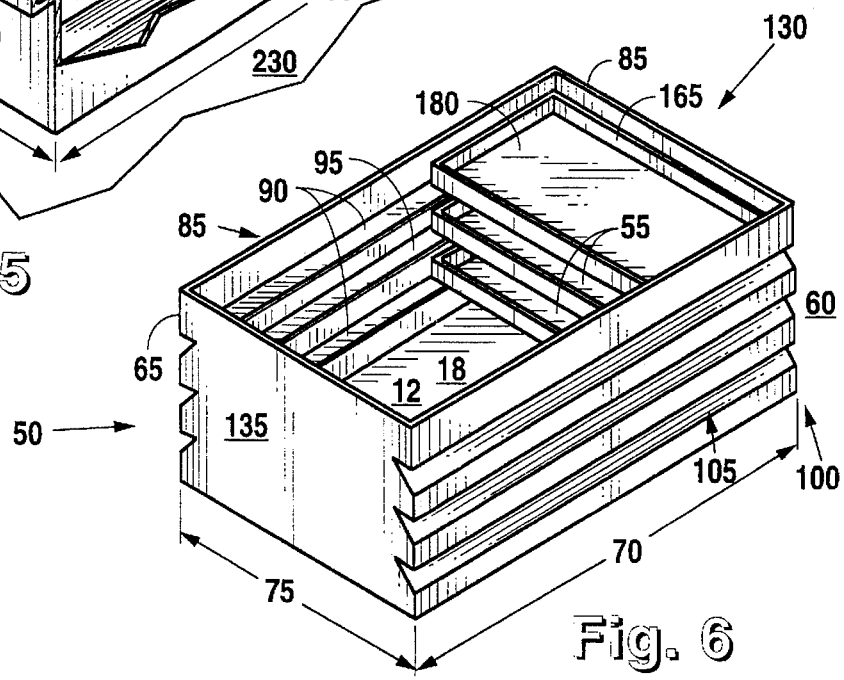
FIG. 6 is a perspective view of the organizaitonal insert viewing downwardly through the open top into the interior of the insert.
Figure 7:
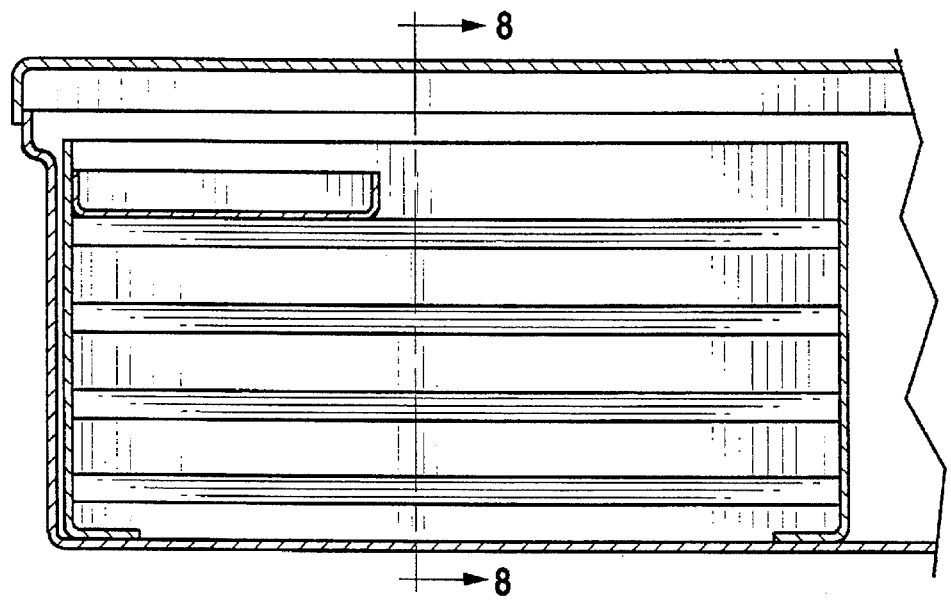
FIG. 7 is a front or back cut-away view of a crossover tool box with an organizational insert installed therein of the present invention taken along cut-lines 7—7 of FIG. 5.

FIG. 6 provides a more detailed perspective of the organizational insert 50. From that illustration, a front wall 85 having a lower end may be clearly seen as being oriented so that it is adjacent to the back side of the passenger cabin of the pick-up truck 225 as shown in FIG. 5. Positioned upon the front wall 85 are backwardly extending elevated front rails 90 that in a preferred embodiment establish a plurality a vertically spaced rails 115. Similarly, a back wall 100 oriented oppositely to the front wall 85 and more distantly from the rear window 235 of the pick-up truck 225 comprises forwardly extending elevated back rails 105 that collectively establish a plurality of vertically spaced elevated back rails 115a. Each rail 90,105 is preferably integrally constructed with the respective wall within which it is included. As may be appreciated from the illustrations of FIGS. 6 and 8, each rail 190,105 is substantially triangularly shaped so that a substantially horizontal top supporting surface 95 is horizontally oriented within the interior 55 of the insert 50. To add additional structural support to the rails 90,105, and more particularly to the top supporting surfaces 95, a brace 125 is included that extends between a distal end 110 of the rails 90,105 and the wall from which the respective rail 90,105 extends.

As may be appreciated in the several FIGS. 5 through 8, the front rails 90 are oppositely oriented to the back rails 105 and oppositely oriented pairs of rails establish tray guides 120. At the right most end of the front and back walls 85,100 (and in turn the front rails 90 and back rails 105) is right side wall 130. A left side wall 135 is similarly oriented at a left most side of the laterally oriented structural components.

Located parallel to the front rails 90 is a bottom front track 140 that is located at a lower end of the front wall 85. Similarly configured is a back track 150 that is also located at a lower end of the back wall 100. In a preferred embodiment, the tracks 140,150 are constructed by turning the lower portion of the walls 85,100 under so that the tracks 140,150 extend into the interior 55 of the insert at a distance approximately equal to the inwardly projecting distance of the rails 90,105. Similar to the rails 90, 105, the front track 140 has a first top tract supporting surface 145 while the back track 150 has a second top tract supporting surface 160. The top supporting surfaces 145,160 are oppositely and horizontally oriented one to the other similar to the paired rails located there above. The lower surface 155 of each track is positioned so as to be either adjacently located immediately above the top surface 210 of the tool box bottom 205, or alternately in face to face engagement therewith.

The organizational insert 50 has an open top side 165 and a substantially open bottom side 170. The open bottom side 170 is slightly restricted by the inwardly projecting front and back tracks 140,150.

A partition 175 is located within a bottom portion of the organization insert 50 and is oriented width wise thereacross. The height of the partition 175 is such that an upper most edge is positioned just below the top supporting surfaces 95 of the lower most pair of rails 90,105 that establish a lower most tray guide 120. This configuration may be best appreciated in FIG. 8 where the partition 175 most clearly shown.

At least one slidable tray 180 is included in the present invention that rests upon the substantial horizontal top supporting surfaces 95 that are oriented into the tray guide pair 120.

In each embodiment of the present invention, it is intended that the components be oriented for utilization within the bed 230 of a pick-truck 225. In practice, the crossover tool box 185 will generally be installed within the bed 230 of the pick-up truck 225 and fixed therein so that it is positioned across a width of a bed 230 directly behind a rear window 235 of the passenger cabin. It is contemplated that the tool box 185 may be secured to the bed in a number of ways which may include screw connections, bulk connections, and other kinds of mechanical joinders which are known within the art. Either prior to the tool box's 185 fixation to the bed 230 or subsequent thereto, the organizational insert 50 may be installed within the interior compartment 220 of the box 185. The insert 50 is appropriately sized so that a minimum clearance is provided between the front wall 85 of the insert 50 and of the front wall of the tool box 185 and also between the back wall 100 of the insert 50 and a back wall of the tool box 185. In a preferred embodiment and configuration, one of the side walls, either 130 or 135 is also adjacently and closely located to an interior wall of the tool box 185. At an opposite end of the insert 50, the other side wall will preferably be located approximately at the middle of the tool box's 185 length. This will also place the other end of the insert 50 approximately even with the middle of the bed 230 of the pick-up truck. In this manner, one-half of the tool box 185 may be organized through use of the insert 50 while the other half of the tool box 185 retains its full interior space for larger items that do not require organization and securement.

Because of the orientation of the plurality of vertically spaced rails 115,115a, a plurality of trays 180 may be utilized upon the tray guides 120 for sliding engagement there upon. During use, the trays 180 may be slid back and forth thereby exposing different levels of the organizational insert 50 and ultimately providing access to all portions of the interior 55 of the insert 50.

Figure 8:
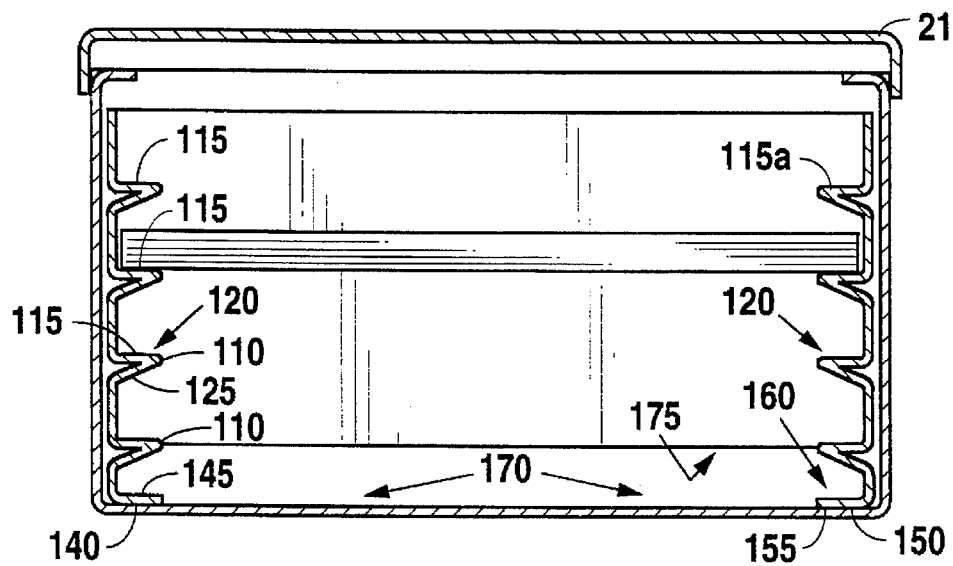
FIG. 8 is an end or side, cut-away side view of the crossover tool box with an organizational insert installed therein of the present invention taken along cut lines 8—8 of FIG. 7.

As illustrated in FIG. 8, the partition 175 is included across a bottom portion of the insert 50. In this manner, the area below the lower most elevated tray guide 120 may be partitioned for segregating different items and securing such things as rolling aerosol cans.

Like the tray guides 120, the upper surfaces 145,160 of the front and back tracks 140,150 provide a guide upon which a tray may smoothly slide. In the event a partition 175 is present, the sliding travel of a tray upon the tracks 140,150 will be impeded and restricted to either of the sides of the partition 175. During use, the tracks 140,150 may be considered a buffer between a bottom side of a slidable tray 180 and what may be a rough top surface 210 of a bottom 205 of the crossover tool box 185.

It is contemplated that the organizational insert 50 may fit sufficiently snugly within the crossover tool box 185 so that relative motion therebetween is prevented. Alternatively it is contemplated that the insert 50 be secured to the tool box 185 by mechanical means. In a preferred embodiment the securement is releasable so that the insert 50 may be removed from the tool box 185 if so desired after installation. Therefore, it is a preferred method of securing the insert 50 within the tool box 185 to use self tapping screws that are inserted from the interior of the organizational insert 50 through at least one wall thereof and into a wall 200 of the tool box 185.

In a preferred embodiment of the invention, upper edges of the four walls of the insert 50 are hemmed so that a smooth surface is presented when a use raises a tool box lid 215.

Referring to FIG. 2, the second embodiment of the invention may be seen in the form of a truck storage box apparatus illustrated generally as 10, and includes a bottom 12, and a plurality of interconnected sides 14 which extend upward from around the periphery of bottom 12, and which intersect at their side edge portions to provide an open topped container 16 for easy access to the interior 18 formed between bottom 12 and sides 14. Generally, bottom 12 may be rectangular, and sides 14 may also have a rectangular shape. As illustrated in the Figures, the number of sides 14 may total four. Sides 14 and bottom 12 may be formed of sheet metal, and attached at their intersection by suitable means such as rivets, screws or welds. The truck storage box apparatus 10 of the present invention is arranged so that the truck storage box apparatus 10 can be easily placed within an existing conventional, non-compartmentalized truck tool box 19, thus allowing access to specific items within tool box 19 without having to replace existing conventional, non-compartmentalized truck tool box 19. Alternately, truck storage box apparatus 10 may be provided with attachment means, discussed hereafter, in order to attach the container 16 directly to the bed of the pick-up truck, holding the truck storage box apparatus 10 in place in the bed of truck. A removable cover 21, or other similar arrangement, may also be provided to cover the open end of container 16.

Referring to FIG. 2, a plurality of spaced pairs of opposed, elongated, but narrow rails 20 extend horizontally along opposite interior wall portions of sides 22, 24 in a spaced relationship with bottom 12. Rails 20 may be provided in the form of elongated angle iron or L-shaped members, which may be attached to sides 22, 24 by suitable means such as rivets, screws or welds. Each pair of opposed rails 20 is arranged to slidably receive and support a number of elongated trays 26 thereon. As best shown in FIG. 2, each of the trays 26 may have a rectangular shape which is arranged to extend horizontally between pairs of opposed rails 20, with opposite end portions thereof slidably supported between pairs of opposed rails 20. As best shown in FIG. 2, trays 26 may be provided in the form of cubicles.

Collectively, as best illustrated in FIG. 4, the pairs of opposed rails 20 form a vertical array 28 in which a number of trays 26 can be supported on each pair of opposed rails 20 in a vertically stacked arrangement 30, illustrated in FIG. 2, from which one or more intermediate trays 26 may selectively be slid horizontally from within the stacked vertical arrangement 30 to various positions for access to the particular tray's contents.

In use, a number of trays 26 may be each filled with particular objects such as wrenches and screwdrivers or wrench sets, for example, and inserted through the open top of container 16, where a number of trays 26 may be supported on each opposed pair of rails 20. Once the desired number of trays 26 is reached on each opposed pair of rails 20, additional trays 26 may be placed on other opposed pairs of rails 20 as desired. Collectively, the trays 26 placed on the vertical array 28 of rails 20 form vertical stacked arrangement 30.

When the user has traveled to the work site, the user may open the truck's tool box 19 for access to the truck storage box apparatus 10 or reach inside the interior of container 16 to selectively obtain access to the desired wrench, screwdriver or wrench set, for example, by selectively sliding one or more trays 26 horizontally, thus removing the selected tray(s) from within the vertical stacked arrangement 30. The user may now reach inside to access the particular contents of the selected tray(s) without having to remove trays from the interior of the container. When finished, the user may replace the item, and restore the selected tray(s) to their vertical stacked arrangement 30, as desired, before returning from the work site.

As various changes can be made in the above described embodiments without departing from the spirit and scope of the invention, it is intended that all matter contained in the above description or shown in the accompanying drawings shall be interpreted as illustrative and not in a limiting sense.

A crossover tool box insert system and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed and desired to be secured by Letters Patent is as follows:

1. A combination crossover tool box having an organizational insert for installment in the bed of a pick-up truck which includes a passenger cabin; said combination comprising:

a crossover tool box installable in the bed of a pick-up truck in a cross wise orientation adjacent to a rear window of the passenger cabin, said tool box having four tool box walls, a tool box bottom and a tool box lid that collectively define an interior compartment of said toot box;

a tool box insert having an insert body that includes four walls, said four walls establishing an interior and an exterior of said insert body;

said tool box insert being positioned within said interior compartment of said tool box, said exterior of said insert body being configured so that at least three sides of said insert are located closely to interior sides of said tool box with a minimum clearance provided therebetween to facilitate the installation and removal of said insert from within said tool box;

said four walls of said tool box insert including a front wall, a back wall, a right-side wall and a left-side wall;

said insert body having an open top side and a substantially open bottom side;

said front wall including at least one backwardly extending elevated front rail projecting into said interior of said insert body and having a substantially horizontal top supporting surface, and said back wall including at least one forwardly extending elevated back rail projecting into said interior of said insert body and having a substantially horizontal top supporting surface;

each of said elevated front and back rails having a brace positioned between a distal end of said rail and said wall from which said rail projects thereby bracing said top supporting surface in a substantially horizontal position against downward forces applied to said supporting surface; and a bottom front track coupled to a lower end of said front wall so that said front track extends backwardly toward said back wall thereby establishing a substantially horizontal first top track supporting surface within a bottom portion of said insert's interior, and a bottom back track coupled to a lower end of said back wall so that said back track extends forwardly toward said front wall thereby establishing a substantially horizontal second top track supporting surface within said bottom portion of said insert's interior.

2. The combination crossover tool box having an organizational insert for installment in the bed of a pick-up truck as recited in claim 1; said combination further comprising:

said front and back tracks being located upon said tool box insert so that a lower surface of each of said tracks is positioned in face-to-face engagement with an upper surface of said tool box bottom.

3. The combination crossover tool box having an organizational insert for installment in the bed of a pick-up truck as recited in claim 1; said combination further comprising:

said front and back tracks being located upon said tool box insert so that a lower surface of each of said tracks is positioned proximate to an upper surface of said tool box bottom.

4. The combination crossover tool box having an organizational insert for installment in the bed of a pick-up truck as recited in claim 3; said combination further comprising:

said backwardly extending elevated front rail being positioned substantially opposite to said forwardly extending elevated back rail so that said top surfaces of said rails are substantially horizontally level to one another and form a rail pair;

said backwardly extending front track being positioned substantially opposite to said forwardly extending back track so that said top surfaces of said tracks are substantially horizontally level to one another and forming a track pair;

said rail pair and said track pair each establishing a pair of tray guides for supporting a sliding tray thereupon and between; and at least one slidable tray positioned upon at least one tray guide for sliding engagement therewith in a substantially horizontal direction.

5. The combination crossover tool box having an organizational insert for installment in the bed of a pick-up truck as recited in claim 4; said combination further comprising:

said track pair providing a buffering distance between a bottom of a tray positioned upon said track and said top surface of said crossover tool box and a smooth guide upon which said tray slides.

6. The combination crossover tool box having an organizational insert for installment in the bed of a pick-up truck as recited in claim 1; said combination further comprising:

said tool box having a length and a width and said insert having a length and a width;

said width of said insert being slightly less than said width of said tool box so that a minimum clearance is provided between said insert and said tool box at said front and back sides of said insert; and said length of said tool box being at least twice as long as said length of said insert so that said insert occupies one-half or less of the interior space of said tool box.

7. A combination crossover tool box with an organizational insert adapted to be installed in the bed of a pick-up truck which includes a passenger cabin; said combination comprising:

a crossover tool box having four tool box walls, a tool box bottom and a tool box lid that collectively define an interior compartment of said tool box;

a tool box insert having an insert body that includes four walls, said four walls establishing an interior and an exterior of said insert body;

said tool box insert being positioned within said interior compartment of said tool box, said exterior of said insert body being configured so that at least three sides of said insert are located closely to interior sides of said tool box with a minimum clearance provided therebetween to facilitate the installation and removal of said insert from within said tool box;

said tool box and insert combination adapted to be installed in the bed of a pick-up truck in a cross wise orientation adjacent to a rear window of the passenger cabin so that a length of said tool box is oriented transversely to a straight forward direction of travel of the pick-up truck;

said four walls of said tool box insert including a front wall, a back wall, a right-side wall and a left-side wall;

said insert body having an open top side and a substantially open bottom side;

said front wall including at least one backwardly extending elevated front rail projecting into said interior of said insert body and having a substantially horizontal top supporting surface, and said back wall including at least one forwardly extending elevated back rail projecting into said interior of said insert body and having a substantially horizontal top supporting surface;

each of said elevated front and back rails having a brace positioned between a distal end of said rail and said wall from which said rail projects thereby bracing said top supporting surface in a substantially horizontal position against downward forces applied to said supporting surface; and a bottom front track coupled to a lower end of said front wall so that said front track extends backwardly toward said back wall thereby establishing a substantially horizontal first top track supporting surface within a bottom portion of said insert's interior, and a bottom back track coupled to a lower end of said back wall so that said back track extends forwardly toward said front wall thereby establishing a substantially horizontal second top track supporting surface within said bottom portion of said insert's interior.

8. The combination crossover tool box with an organizational insert installed in the bed of a pick-up truck as recited in claim 7; said combination further comprising:

said front and back tracks being located upon said tool box insert so that a lower surface of each of said tracks is positioned in face-to-face engagement with an upper surface of said tool box bottom.

9. The combination crossover tool box with an organizational insert installed in the bed of a pick-up truck as recited in claim 7; said combination further comprising:

said front and back tracks being located upon said tool box insert so that a lower surface of each of said tracks is positioned proximate to an upper surface of said tool box bottom.

10. The combination crossover tool box with an organizational insert installed in the bed of a pick-up truck as recited in claim 9; said combination further comprising:

said backwardly extending elevated front rail being positioned substantially opposite to said forwardly extending elevated back rail so that said top surfaces of said rails are substantially horizontally level to one another and form a rail pair;

said backwardly extending front track being positioned substantially opposite to said forwardly extending back track so that said top surfaces of said tracks are substantially horizontally level to one another and forming a track pair;

said rail pair and said track pair each establishing a pair of tray guides for supporting a sliding tray thereupon and between; and at least one slidable tray positioned upon at least one tray guide for sliding engagement therewith in a substantially horizontal direction.

11. The combination crossover tool box with an organizational insert installed in the bed of a pick-up truck as recited in claim 10; said combination further comprising:

said track pair providing a buffering distance between a bottom of a tray positioned upon said track and said top surface of said crossover tool box and a smooth guide upon which said tray slides.

12. The combination crossover tool box with an organizational insert installed in the bed of a pick-up truck as recited in claim 7; said combination further comprising:

said tool box having a length and a width and said insert having a length and a width;

said width of said insert being slightly less than said width of said tool box so that a minimum clearance is provided between said insert and said tool box at said front and back sides of said insert; and said length of said tool box being at least twice as long as said length of said insert so that said insert occupies one-half or less of the interior of said tool box.

* * * * *